United States Patent
Conkey et al.

(10) Patent No.: US 10,266,676 B2
(45) Date of Patent: Apr. 23, 2019

(54) PLASTIC ENGINE COVER

(71) Applicant: DSM IP ASSETS B.V., Heerlen (NL)

(72) Inventors: James Beam Conkey, Birdsboro, PA (US); Peter Clinton Schmieg, Cypress, TX (US)

(73) Assignee: DSM IP ASSETS B.V., Heerlen (NL)

( * ) Notice: Subject to any disclaimer, the term of this patent is extended or adjusted under 35 U.S.C. 154(b) by 352 days.

(21) Appl. No.: 14/399,374

(22) PCT Filed: May 1, 2013

(86) PCT No.: PCT/EP2013/059068
§ 371 (c)(1),
(2) Date: Nov. 6, 2014

(87) PCT Pub. No.: WO2013/167436
PCT Pub. Date: Nov. 14, 2013

(65) Prior Publication Data
US 2015/0152250 A1 Jun. 4, 2015

Related U.S. Application Data

(60) Provisional application No. 61/644,596, filed on May 9, 2012.

(30) Foreign Application Priority Data

May 16, 2012 (EP) .................................. 12168275

(51) Int. Cl.
| | |
|---|---|
| *F02F 3/00* | (2006.01) |
| *C08K 7/14* | (2006.01) |
| *B29D 99/00* | (2010.01) |
| *B29C 45/00* | (2006.01) |
| *F02B 77/02* | (2006.01) |
| *B29K 77/00* | (2006.01) |
| *F02F 7/00* | (2006.01) |
| *F01M 11/00* | (2006.01) |
| *B29L 31/30* | (2006.01) |

(52) U.S. Cl.
CPC ............ *C08K 7/14* (2013.01); *B29C 45/0001* (2013.01); *B29D 99/006* (2013.01); *F02B 77/02* (2013.01); *B29K 2077/00* (2013.01); *B29L 2031/30* (2013.01); *B29L 2031/3055* (2013.01); *F01M 2011/0091* (2013.01); *F02F 7/006* (2013.01); *F02F 7/0065* (2013.01)

(58) Field of Classification Search
USPC .............. 123/193.3; 264/328.1, 331.19, 334; 524/606
See application file for complete search history.

(56) References Cited

U.S. PATENT DOCUMENTS

| | | | |
|---|---|---|---|
| 5,183,843 A * | 2/1993 | Sakai ..................... | C08K 5/098 524/317 |
| 5,248,738 A | 9/1993 | Sato et al. | |
| 6,747,120 B2 | 6/2004 | Rulkens et al. | |
| 2002/0115818 A1 | 8/2002 | Ogo et al. | |
| 2003/0207116 A1 | 11/2003 | Franken et al. | |
| 2005/0266232 A1 | 12/2005 | Wang et al. | |
| 2010/0279550 A1* | 11/2010 | Rulken ................ | C08G 69/265 439/625 |

FOREIGN PATENT DOCUMENTS

| | | |
|---|---|---|
| CN | 1359980 | 7/2002 |
| CN | 101302338 A | 11/2008 |
| JP | 61-278561 | 12/1986 |
| JP | 07-055015 | 3/1995 |
| JP | 2002-028934 | 1/2002 |
| JP | 2003-148243 | 5/2003 |
| JP | 2003148243 A * | 5/2003 |
| JP | 2004-306486 | 11/2004 |
| JP | 2006-348057 | 12/2006 |
| JP | 2007-031484 | 2/2007 |
| WO | WO 2011/135018 | 11/2011 |

OTHER PUBLICATIONS

Machine Translation of JP2003148243A PDF File Name: "JP2003148243A_Machine_Translation.pdf".*
International Search Report for PCT/EP2013/059068 dated Jun. 5, 2013.
DSM Engineering Plastics: "StanylForTii (NC1101A)", Jan. 11, 2012, XP002679363, http://prospector.ides.com/DataView.as ,px?l=&TAB=DV DS&E.
CN Application No. 201380024457X, Search Report (dated May 1, 2013).

* cited by examiner

*Primary Examiner* — Lindsay Low
*Assistant Examiner* — Ruben Picon-Feliciano
(74) *Attorney, Agent, or Firm* — Nixon & Vanderhye P.C.

(57) ABSTRACT

The invention relates to a plastic engine cover, as well as to a process for making the plastic engine cover and to an engine comprising the plastic engine cover. The plastic engine cover is made of a glass fiber reinforced thermoplastic polymeric material comprising a polyamide with units derived from terephthalic acid and from diamino butane.

14 Claims, No Drawings

PLASTIC ENGINE COVER

This application is the U.S. national phase of International Application No. PCT/EP2013/059068 filed 1 May 2013 which designated the U.S., claims the benefit of U.S. Provisional Application No. 61/644,596 filed 9 May 2012, and claims priority to European Patent Application No. 12168275.1 filed 16 May 2012, the entire contents of each of which are hereby incorporated by reference.

The invention relates to a plastic engine cover, as well as to a process for making the plastic engine cover and to an engine comprising the plastic engine cover.

The invention deals with the conversion of a metal engine cover in a plastic engine cover. The engine cover is in particular intended for use in the engine of personal cars.

An engine cover can be in different shapes and for different functions, such as a plastic oil pan, a timing chain cover, a front engine cover (i.e. the cover opposite to the crankshaft, irrespective of whether the engine is positioned longitudinal transversal), a cylinder head cover, a timing chain cover, or a crank case cover, also called output crankshaft or rear crankshaft cover.

One of the issues is that the engine cover is part of a multi-component modular assembly, wherein the cover is mechanically fastened to a number of parts or modules. Herein the engine cover has to mate properly with an irregular surface of mating parts and modules in the engine. Conversion of a metal cover to a plastic material in such a multi-component modular assembly has several problems.

The engine cover is or can be in contact with a number of fluids such as oils, water, water/glycol mixtures, methanol, ethanol, gasoline based fuels, lubricants, greases, brake fluids, automatic transmission fluid, steering fluids, road salts, bio fuels, diesel fuels, etc. The cover has to seal these fluids from leaking from the engine, or to keep those away from the engine, or to prevent deterioration of the cover due to contact with such liquids. The sealing function may be realized by direct contact through mechanical fastening, or by inclusion of an additional sealing component. The sealing component may be, for example, silicone RTV (room temperature vulcanisation), a fluoroelastomer (FKM), preformed rubber, press in place rubber or synthetic rubber, moulded in place, cured in place or pre-cured. Furthermore, due to the operation of the engine the operational environment of the engine cover includes cycling of temperatures between −60 and 230° C. For the mounting different systems may be applied. For example, for the modular mounted component, loads as high as 1800N or higher may be applied, while clamp loads can be as high as 60 kN. Also internal pressure can vary, for example the pressure for a water pump in a cooling system may be as high as 500 kN, whereas the internal pressure inside a crankcase can be as high as 30 MPa. The engine cover must be able to withstand such high pressures.

Thus an important requirement is that the engine cover provides for proper sealing over a wide temperature range and over a wide pressure range and that the sealing function is maintained over a long life time while being in contact with various fluids.

Whereas for less critical applications, such as for top covers, bearing hardly any mechanical load, plastic engine covers have already found their practical use, for more critical engine covers, such as a timing chain cover, a crank case cover or a (rear) crankshaft cover, plastic engine covers have not been able to provide the required functions. A particular critical issue is the inability to accommodate high stresses encountered at miss-matches between multiple metallic parts spanned by the plastic part and maintain a seal between these parts, resulting in inadequate sealing properties.

Another issue for different types of engine covers is alignment with mating parts and modules in the engines comprising elements that have to pass through holes in the engine covers. Such engine covers do not only have complex shapes, but are even more critical in dimensional shape and in the sealing function. This is in particular the case for engine covers such as timing chain covers, timing belt covers, and crank-shaft covers.

The aim of the present invention is to provide a plastic engine cover, and a process for its preparation, which has good sealing properties over a wide temperature range and a wide pressure range and which sealing function is maintained over a long life time while being in contact with various engine fluids.

This aim has been achieved with the process according the process and the plastic engine cover according the invention.

In one embodiment, the invention provides a process for making a plastic engine cover, comprising the steps of:
(A) providing an injection moulding installation comprising an injection moulding apparatus and a mould having a cavity shaped in the form of the engine cover;
(B) providing a thermoplastic polymeric injection moulding material comprising
   (a) a semi-crystalline thermoplastic polyamide polymer comprising:
      (a.i) units derived from dicarboxylic acid comprising at least 75 mole %, relative to the total molar amount of units (a.i), of units derived from terephthalic acid,
      (a.ii) units derived from diamines comprising at least 20 mole %, relative to the total molar amount of units (a.ii), of units derived from diamino butane, and optionally
      (a.iii) other units, wherein the other units (a.iii), if present at all, are present in a molar amount of at most 10 mole %, relative to the total molar amount of (a.i), (a.ii) and (a.iii), and
   (b) at least 20 wt. %, relative to the total weight of the thermoplastic polymeric material, of a glass fibre reinforcing material;
(C) melt processing the thermoplastic polymeric injection moulding material in the injection moulding installation, injecting the thermoplastic injection moulding material into the cavity, allow the injected thermoplastic injection moulding material to solidify into a solid moulded part and demoulding the solid moulded part from the mould.

In another embodiment, the invention provides an engine cover made of a plastic material, wherein the plastic material from which the engine cover is made is a thermoplastic polymeric material comprising:
(a) a semi-crystalline thermoplastic polyamide polymer comprising
   (a.i) units derived from dicarboxylic acid comprising at least 75 mole %, relative to the total molar amount of units (a.i), of units derived from terephthalic acid,
   (a.ii) units derived from diamines comprising at least 20 mole %, relative to the total molar amount of units (a.ii), of units derived from diamino butane, and optionally
   (a.iii) other units, wherein the other units (a.iii), if present at all, are present in a molar amount of at most 10 mole %, relative to the total molar amount of (a.i), (a.ii) and (a.iii), and (b) at least 20 wt. %, relative to the total weight of the thermoplastic polymeric material, of a glass fibre reinforcing material.

The effect of the plastic engine cover according to the invention, made of the material described above, respectively made by the process described above, is that the plastic engine cover provides good sealing properties over a wide temperature range. Furthermore, the plastic engine cover has a good resistance against glycol/water mixtures, has a very low biofuel permeation rate, and a good compatibility with existing gasket materials such as Loctite 5904 RTV (ex Henkel, Germany).

It has been observed that the plastic engine cover according to the invention, made of the material comprising the polyamide with units derived from terephthalic acid and from diamino butane in combination with glass fibre reinforcement, is performing better in engines with many aluminum parts in terms of sealing characteristics than other polyamide materials. This difference in performance is despite the fact that such other materials may for example have thermal expansion coefficients even closer to that of aluminum.

In a preferred embodiment of the invention, the thermoplastic polymeric material used for the plastic engine cover comprises a polyamide, wherein the units derived from dicarboxylic acid (a.i) consist of at least 80 mole %, preferably 85-95 mole % (e.g., 90-95 mole %), relative to the total molar amount of units (a.i), of units derived from terephthalic acid, and/or the units derived from diamines (a.ii) consist of least 30 mole %, preferably 40-75 mole %, relative to the total molar amount of units (a.ii), of units derived from diamino butane.

In another preferred embodiment, the thermoplastic polymeric material comprises (a) 30-75 wt. % of the semi-crystalline thermoplastic polyamide polymer and (b) 25-60 wt. %, of the glass fibre reinforcing material. Herein the wt. % is relative to the total weight of the thermoplastic polymeric material. Suitably the glass fibre reinforcing material is present in an amount of for example, about 30 wt. %, or about 40 wt. % or about 50 wt. %, relative to the total weight of the thermoplastic polymeric material.

The thermoplastic polymeric material used for the plastic engine cover according to the invention suitably comprises one or more components (c) other than (a) and (b). These other component or components may be any auxiliary component used in thermoplastic polymeric injection moulding material materials. Suitably, the material comprises, for example, one or more components selected from stabilizers, processing aids, fillers, pigments, flame retardants, impact modifiers, etc.

The amount of (c) may vary over a wide range, for example from 0.01-50 wt. %, relative to the total weight of the thermoplastic polymeric material. Suitably, the amount of (c) is in the range of 0.1-30 wt. %, whereas in particular (c) is present in a total amount of at most 20 wt. %, relative to the total weight of the thermoplastic polymeric material. The amounts of specific components shall be selected such that these do not corroborate the properties such as the sealing properties, and oil and water/glycol resistance.

The good sealing characteristics of the plastic engine cover according to the invention are in particular advantageously applied in an engine cover which comprises at least one hole for receiving an element of an engine part. Herein the engine cover suitably is a timing chain cover, a timing belt cover, or a crank-shaft cover.

The semi-crystalline thermoplastic polyamide polymer suitably has a relative viscosity of at least 1.8. The relative viscosity may be higher for example at least 2.0 or even at least 2.2. It has been observed that a low relative viscosity of for example in the range of 1.8-2.0 is favourable for obtaining a lower CLTE value, whereas a higher relative viscosity, for example in the range of 2.0-3.0 gives an acceptable CLTE, while at the same time the water/glycol resistance is improved. With a relative viscosity in the range of 2.0-2.6 an optimal balance in CLTE and water/glycol resistance is obtained. Herein the relative viscosity (RV) is measured in 96% sulphuric acid at 25° C. according to method to ISO 307, fourth edition.

As mentioned above, the thermoplastic polymeric material does not necessarily have to have a particular low plastic coefficient of linear thermal expansion (CLTE). The CLTE can be higher than that of other polyamide based thermoplastic polymeric material and further away from aluminum, while still providing a good sealing performance. Suitably, the thermoplastic polymeric material has a coefficient of linear thermal expansion (CLTE) in parallel direction at 20° C., measured by the method according to ISO 11359-2, in the range of $2.6\text{-}3.5*10^{-5}/°$ C., more particular in the range of $2.8\text{-}3.3*10^{-5}/°$ C.

The invention also relates to an engine comprising an engine block made and other parts made of metal and a plastic engine cover, the plastic engine cover being assembled on and attached to the engine block, wherein the engine cover is a plastic engine cover according to the invention or any particular or preferred embodiment, or combination thereof, as describes above.

In a preferred embodiment of said engine, the plastic engine cover comprises one or more holes, the engine comprises an element protruding through the hole, or more elements each protruding through a hole, wherein the elements are engaged in sealing engagement with the engine cover. Suitably, the element or elements herein are one or more of a crank-shaft or a part of a water pump.

In a particular embodiment of the engine, the engine cover is a timing chain cover, a timing belt cover, or a crank-shaft cover.

The invention is further illustrated by the following examples and comparative experiments.

METHODS

Coefficient of Linear Thermal Expansion (CLTE)

The CLTE was measured on multi-purpose test specimen, dimensions 30×10×4 mm, (according to ISO 3167, moulded by injection moulding) in parallel or flow direction at 20° C. by the method according to ISO 11359-21999. The measurement was on 10 samples from which the average value was calculated.

| Materials | |
|---|---|
| PA-1 | Thermoplastic polyamide injection moulding composition comprising a semi-aromatic polyamide with 90 mole % terephthalic acid units and 50 mole % of diamino butane units and 30 wt. % of glass fibres; CLTE $3.0 * 10^{-5}/°$ C. (ex DSM Engineering Plastics B.V., The Netherlands). The semi-aromatic polyamide herein had a relative viscosity of 2.3. The measurement was done on a polymer solution at a concentration of 1 gram of polymer, pre-dried under high vacuum (i.e. less than 50 mbar) at 80° C. during 24 hours, in 100 ml of sulphuric acid. The flow time of the solution (t) and the solvent (to) were measured using a DIN-Ubbelohde from Schott (ref. no. 53020) at 25° C. The relative viscosity is defined as t/t0. |

-continued

| Materials |
|---|
| PA-2 Stanyl TW200F6, a thermoplastic polyamide injection moulding composition comprising polyamide-4,6 and 30 wt. % glass fibres, CLTE 2.5 * $10^{-5}$/° C. (ex DSM Engineering Plastics B.V., The Netherlands). |
| PA-3 Zytel HTN 52 G35; a thermoplastic polyamide injection moulding composition comprising a semi-aromatic polyamide, based on terephthalic acid units and diamino hexane, and 35 wt. % of glass fibres; CLTE 2.1 * $10^{-5}$/° C. (ex DuPont Company, USA). |

Sealing Performance in a Timing Chain Cover

The three polyamide materials were evaluated in a mould design for a timing chain cover in assembly with an aluminum engine block, varying the temperature over a range from −40 to 150° C. It appeared that the sealing performance of PA-1 was much better than that of PA-2 and PA-3, despite the fact that the CLTE of both these materials was much closer to that of 2.3*$10^{-5}$/° C. for the aluminum (value from Gere and Timoshenko; Mechanics of Materials, Third SI Edition, Published by Chapman & Hall, 2-6 Boundery Row, London SE1 8HN, 1993, page 782).

Adhesion Tests

Adhesion tests were done according to ASTM D1002 "Apparent Shear strength of single Lap Joint Adhesively Bonded Metal Specimens by tension Loading". Materials used were PA-1, adhesives Loctite 5904 (ADH-1) and Loctite 5999 (ADH-2), which are both RTV silicone products from Henkel, Dexos®-1 engine oil and 2024 Aluminum Lap Shear material. The PA-1 was moulded into plaques which were cut into 25.4 mm×101.6 mm specimens. Abraded bare Aluminum Lap Shear strips of 1.5×25.4× 101.6 mm were adhered to the specimen. The so-obtained test samples were immersed in the engine oil at 150° C. and kept for 168 hours, respectively 504 hours. Afterwards test samples were taken out of the oil, cooled to room temperature and residual oil was taken off. The lap shear strength (LSS) and the joint movement were measured, and the failure mode was inspected. The percentage of cohesive failure (CF) was reported. The results were compared with controls, not subjected to oil immersion. For each of the conditions 5 samples were tested and the average values calculated. The results are shown in Table 1.

TABLE 1

Adhesion test results after exposure to hot oil.

|  | Lap Shear Strength (MPa) | Joint Movement (mm) | Failure Mode (% CF) |
|---|---|---|---|
| ADH-1 |  |  |  |
| Control | 1.04 | 3.52 | 0.50 |
| 168 hours | 1.04 | 4.30 | 0.49 |
| 504 hours | 0.95 | 4.41 | 0.32 |
| ADH-2 |  |  |  |
| Control | 0.54 | 0.68 | 0.00 |
| 168 hours | 0.66 | 1.48 | 0.00 |
| 504 hours | 0.59 | 1.58 | 0.00 |

The results show that the PA-1 material has good adhesion properties to the tested RTV silicones, and that the bond between the aluminum strips is well retained upon treatment in hot oil, illustrating a good oil resistance as well.

Water/Glycol, Resistance

The polyamide materials PA-1, PA-2 and PA-3 were moulded on an injection moulding machine in a mould to form test bars conforming ISO 527/1A multipurpose specimens. The thickness of the test bars was 4 mm. The temperature of the melt in the injection moulding machine was set at about 20° C. above the melting temperature of the polyamide, the temperature of the mould was set at about 20° C. below the glass transition temperature of the polyamide.

The test bars were used to measure the water/glycol resistance at elevated temperature. Test bars were immersed in a water/ethylene glycol mixture (50/50 by weight) in a pressure vessel and kept at 120° C. for different time periods. After different time intervals test bars were taken out, cooled to room temperature and dried with some tissue paper. The mechanical properties (tensile modulus [MPa], tensile strength [MPa], elongation at break [%]) were measured in a tensile test according to ISO 527 at 23° C. For each measurement, 4 test bars were tested and the average value calculated. The results are shown in Table 2.

TABLE 2

Test results after exposure to hot water/glycol mixture.

|  | PA-1 | PA-2 | PA-3 | PA-1 | PA-2 | PA-3 |
|---|---|---|---|---|---|---|
| Time (hours) | Tensile Strength (MPa) | | | Retention Tensile Strength (%) | | |
| 0 | 180 | 210 | 190.8 |  |  |  |
| 1000 | 122.2 | 44.5 | 67.2 | 68 | 21 | 35 |
| 1803 | 114.8 | 18.7 | 52.2 | 64 | 9 | 27 |
| 3082 | 91.7 | 10.9 | 22.5 | 51 | 5 | 12 |
| 4090 | 78.6 | 10.9 | 19 | 44 | 5 | 10 |
|  | Elongation @ Break (%) | | | Retention Elongation @ Break (%) | | |
| 0 | 2.0 | 4 | 2.23 |  |  |  |
| 1000 | 2.2 | 1.4 | 1.5 | 110 | 35 | 67 |
| 1803 | 1.9 | 0.63 | 1.1 | 95 | 16 | 49 |
| 3082 | 1.6 | 0.47 | 0.46 | 80 | 12 | 21 |
| 4090 | 1.5 | 0.45 | 0.36 | 75 | 11 | 16 |
|  | Tensile Modulus (MPa) | | | Retention Tensile Modulus (%) | | |
| 0 | 11,000 | 10,000 | 11,772 |  |  |  |
| 1000 | 8,755 | 4,139 | 7,236 | 80 | 41 | 61 |
| 1803 | 8,786 | 3,590 | 6,938 | 80 | 36 | 59 |
| 3082 | 7,639 | 3,079 | 5,901 | 69 | 31 | 50 |
| 4090 | 7,295 | 3,178 | 5,866 | 66 | 32 | 50 |

The results in Table 2 show that PA-1, a material falling within the scope of the present invention, has a much better water/glycol resistance than PA-2 and PA-3, as PA-1 performs much better in retention of its mechanical properties upon long term exposure to hot water/glycol mixture. In particular the tensile strength and elongation of PA-1 are much better retained even after 4000 hours, while for PA-2 and PA-3 these properties have been seriously diminished.

The invention claimed is:

1. A process for making a plastic engine cover comprising the steps of:
   (A) providing an injection moulding installation comprising an injection moulding apparatus and a mould having a cavity shaped in the form of the engine cover;
   (B) providing a thermoplastic polymeric injection moulding material comprising:
      (a) a semi-crystalline thermoplastic polyamide polymer comprising (a.i) units derived from dicarboxylic acid comprising at least 90 mole %, relative to the total molar amount of units (a.i), of units derived from terephthalic acid, (a.ii) units derived from diamines comprising at least 20 mole %, relative to the total molar amount of units (a.ii), of units derived from diamino butane, and optionally (a.iii) units other than units (a.i) and (a.ii) in a molar amount of 0-10 mole %, relative to the total molar amount of units (a.i), units (a.ii) and units (a.iii), and (b) at least 20 wt. %, relative to the total weight of the thermoplastic polymeric material, of a glass fibre-reinforcing material; and (C) melt processing the thermoplastic injection moulding material in the injection moulding installation by injecting the thermoplastic injection moulding material into the cavity, allowing the injected thermoplastic injection moulding material to solidify into a solid moulded part in the mold and demoulding the solid moulded part from the mould.

2. The engine cover according to claim 1, wherein:
the units (a.i) derived from dicarboxylic acid consist of 90-95 mole %, relative to the total molar amount of units (a.i), of units derived from terephthalic acid; and/or
the units (a.ii) derived from diamines consist of 40-75 mole %, relative to the total molar amount of units (a.ii), of units derived from diamino butane.

3. An engine cover made of a plastic material, wherein the plastic material from which the engine cover is made is a thermoplastic polymeric material comprising:

(a) a semi-crystalline thermoplastic polyamide polymer comprising (a.i) units derived from dicarboxylic acid comprising at least 90 mole %, relative to the total molar amount of units (a.i), of units derived from terephthalic acid, (a.ii) units derived from diamines comprising at least 20 mole %, relative to the total molar amount of units (a.ii), of units derived from diamino butane, and optionally (a.iii) units other than units (a.i) and (a.ii) in a molar amount of 0-10 mole %, relative to the total molar amount of units (a.i), units (a.ii) and units (a.iii), and (b) at least 20 wt. %, relative to the total weight of the thermoplastic polymeric material, of a glass fibre-reinforcing material.

4. The engine cover according to claim 3, wherein the units (a.ii) derived from diamines consist of at least 30 mole %, relative to the total molar amount of units (a.ii), of units derived from diamino butane.

5. The engine cover according to claim 3, wherein the thermoplastic polymeric material comprises:
(a) 30-75 wt. % of the semi-crystalline thermoplastic polyamide polymer; and
(b) 25-60 wt. %, of the glass fibre-reinforcing material, wherein
the wt. % are relative to the total weight of the thermoplastic polymeric material.

6. The engine cover according to claim 3, wherein the thermoplastic polymeric material further comprises (c) at least one other component selected from the group consisting of stabilizers, processing aids, fillers, pigments, flame retardants and impact modifiers.

7. The engine cover according to claim 3, wherein the at least one other component (c) is present in a total amount of 0.01-50 wt. %, relative to the total weight of the thermoplastic polymeric material.

8. The engine cover according to claim 3, wherein the engine cover comprises at least one hole for receiving an element of an engine part.

9. The engine cover according to claim 3, wherein the thermoplastic polymeric material has a coefficient of linear thermal expansion (CLTE) in parallel direction at 20° C., measured by the method according to ISO 1 1359-2, 1999, of $2.6\text{-}3.5*10^{-5}$/° C.

10. The engine cover according to claim 3, wherein the semi-crystalline thermoplastic polyamide polymer has a relative viscosity of at least 2.0.

11. An engine comprising an engine block made of metal and the plastic engine cover according to claim 3 assembled on and attached to the engine block.

12. The engine according to claim 11, wherein the engine cover comprises one or more holes, and wherein the engine comprises one or more elements protruding through the one or more holes, respectively, and being sealingly engaged with the engine cover.

13. The engine according to claim 12, wherein the one or more elements are selected from the group of engine parts selected from a crank-shaft part and a water pump part.

14. The engine according to claim 11, wherein the engine cover is a timing chain cover, a timing belt cover, or a crank-shaft cover.

\* \* \* \* \*